United States Patent [19]

Tarman

[11] Patent Number: 4,971,605

[45] Date of Patent: Nov. 20, 1990

[54] ISOTHERMAL THERMO-CYCLIC PROCESSING

[75] Inventor: Paul B. Tarman, Elmhurst, Ill.

[73] Assignee: Institute of Gas Technology, Chicago, Ill.

[21] Appl. No.: 408,961

[22] Filed: Sep. 18, 1989

[51] Int. Cl.$^5$ .............................................. B01D 53/04
[52] U.S. Cl. .......................................... 55/25; 55/57; 55/74; 55/75; 423/248
[58] Field of Search ................... 55/33, 57, 58, 74–79, 55/179–181, 208, 267, 269, 387–390, 25, 26; 165/10 A; 423/248

[56] References Cited

U.S. PATENT DOCUMENTS

| | | | |
|---|---|---|---|
| 3,734,293 | 5/1973 | Biskis | 55/197 X |
| 3,839,847 | 10/1974 | Banikiotes et al. | 55/58 |
| 3,850,592 | 11/1974 | Huffman | 55/208 X |
| 4,003,426 | 1/1977 | Best et al. | 165/10 A X |
| 4,026,680 | 5/1977 | Collins | 55/208 X |
| 4,165,972 | 8/1979 | Iles et al. | 55/208 X |
| 4,360,505 | 11/1982 | Sheridan, III et al. | 423/248 X |
| 4,421,661 | 12/1983 | Claar et al. | 165/10 A X |
| 4,444,727 | 4/1984 | Vanagihara et al. | 423/248 X |
| 4,512,388 | 4/1985 | Claar et al. | 165/10 A X |
| 4,566,281 | 1/1986 | Sandrock et al. | 165/10 A X |
| 4,597,434 | 7/1986 | Menelly | 165/10 A |
| 4,645,519 | 2/1987 | Fraioli et al. | 55/208 |
| 4,687,650 | 8/1987 | Goodell et al. | 423/248 |
| 4,696,338 | 9/1987 | Jensen et al. | 165/10 A X |
| 4,700,550 | 10/1987 | Rhodes | 55/208 X |
| 4,768,579 | 9/1988 | Patry | 165/10 A |
| 4,793,402 | 12/1988 | Vano et al. | 165/10 A |
| 4,822,391 | 4/1989 | Rockenfeller | 55/208 X |

FOREIGN PATENT DOCUMENTS

| | | | |
|---|---|---|---|
| 56-160599 | 12/1981 | Japan | 165/10 A |
| 57-200192 | 11/1984 | Japan | 165/10 A |
| 62-123001 | 6/1987 | Japan | 55/208 |

Primary Examiner—Robert Spitzer
Attorney, Agent, or Firm—Thomas W. Speckman; Douglas H. Pauley

[57] ABSTRACT

Substantially isothermal thermo-cyclic chemical and physical processes are achieved by conduct of the thermo-cyclic process conducting the thermo-cyclic process in thermal exchange relation with a sufficient quantity of transition thermal absorption/release material to operate the thermo-cyclic process substantially isothermally at about the transition temperature of the thermal absorption/release material during the exothermic and the endothermic portions of the thermo-cyclic process.

30 Claims, No Drawings

ISOTHERMAL THERMO-CYCLIC PROCESSING

BACKGROUND OF THE INVENTION

1. Field of the Invention

This invention relates to chemical and physical cyclic processing systems which undergo cyclic temperature change. This temperature change usually significantly limits the processing capability of the system. Thermo-cyclic processing systems cover a very broad spectrum, ranging from physical pressure-swing adsorption/-desorption of carbon dioxide by activated carbon at temperatures of 100° F. for cleaning natural gas to chemical reduction/oxidation of metal oxides at temperatures of 1500° F. for oxygen enrichment of air and low $NO_x$ cyclic combustion of natural gas at 2000° F. According to the present invention, the thermo-cyclic process is conducted in thermal exchange relation with a sufficient quantity of thermal absorption/release material to operate the process substantially isothermally at about the transition, such as phase-change, temperature of the thermal absorption/release material during exothermic and endothermic portions of the thermocyclic process.

2. Description of the Prior Art

The adsorption of gas or vapor is always associated with the evolution of heat in an active adsorption zone. This evolution of heat causes a temperature rise which significantly limits the sorptive capacity of the system. In normal operation, a high-temperature wave progresses through a sorbent bed in advance of the gas or vapor adsorptive wave so that the bed temperature and thus the exit gas temperature rises before the adsorption break-point or sorptive capacity is reached. Cooling coils have been placed in such adsorbers to remove the heat of adsorption which reduces the temperature rise and makes the sorbent action more nearly isothermal. Use of cooling coils in adsorbers has produced considerable increase in sorptive capacity. However, due to poor thermal exchange in sorption beds, an extensive and costly heat exchange system is required. Furthermore, heat removed during the adsorption segment of the cycle must be replaced during desorption or regeneration portion of the cycle. This is usually accomplished by application of external heat during regeneration, such as using hotter regeneration gases. Thus, the overall process is less thermally efficient. Because of the additional capital costs for heat exchange surface and additional operating costs for supply of external regeneration heat, the use of cooling coils is very limited in commercial practice.

A more common practice is to use a much larger sorbent bed to reduce the temperature rise due to adsorption as described in Kohl, A. L. and Riesenfeld, F. C., Gas Purification. 4th Ed. Gulf Publishing Company, Houston, TX, Chapter 12, Gas Dehydration and Purification by Adsorption, 645–648, 1985. In this method, the additional sorbent acts as a heat sink, as well as a sorbent, reducing the peak temperature of the temperature wave. This, coupled with the extra sorbent in the bed, compensates somewhat for the loss of sorbent capacity due to temperature rise. If large excesses of sorbent are used, much of the heat of sorption can be stored within the bed in this manner. However, since heat is stored using the sensible heat capacity of the sorbent, a temperature rise sufficient to store this heat must still occur, and this temperature rise reduces sorptive capacity of the sorbent. Molecular sieve adsorbent beds use this principle for drying organic-water azeotropes, such as ethanol/water under conditions to store much of the heat of adsorption during the drying portion of the cycle and using the stored heat during the regeneration portion of the cycle as described in Garg, D. R. and Yon, C. M., "Adsorptive Heat Recovery Drying System," *Chem. Eng. Progr.*, 54–60, February 1986.

Yang and Cen, in "Improved Pressure Swing Adsorption Processes for Gas Separation by Heat Exchange Between Adsorbers and by High-Heat-Capacity Inert Additives," *Ind. Eng. Chem. Proc. Des. Dev.* 25, 54–59, 1986, have suggested by model simulation that an inert solid material with a high sensible heat capacity be added to the adsorbent bed to reduce the need for excess sorbent. Yang and Cen, in their model simulation, added various amounts of iron particles to a bed of activated carbon that was used to separate 50/50 hydrogen/methane ($H_2/CH_4$) and 50/50 hydrogen/carbon monoxide ($H_2/CO$) mixtures by adsorption. The use of 20 weight percent of iron resulted in reduction of the peak temperature of the activated carbon bed from about 100° C. to about 50° C., thereby improving the separation of 50/50 $H_2/CO$ mixtures. This use of a high sensible heat capacity material reduces the magnitude of the temperature changes that occur during the adsorption/desorption cycle, but cannot reduce the temperature changes as far as desired since the storage of heat as sensible requires temperature change to effect storage.

Several other sorption-heat related methods exist. U.S. Pat. No. 4,341,539 teaches a thermally regenerative desiccant element of micron size silica gel held within an expanded web of fluoro plastic elastomer which is bonded onto a heat conductive plate which is cooled by a stream of cooled air to remove the heat of sorption. A number of patents disclose sorbent improvement with various additives: U.S. Pat. No. 2,255,041 teaching calcium chloride as a hygroscopic agent incorporated with calcium hydrosilicate and/or calcium hydroaluminate skeleton chemically anchoring the hygroscopic agent to the skeletal network to result in a structure of considerable resilience; both U.S. Pat. Nos. 4,366,090 and 2,292,632 teach a support material of an alkali metal silicate into which is incorporated an adsorbent material to result in good mechanical strength; U.S. Pat. No. 2,625,516 teaching improving drying properties by coating calcium sulfate with alkali metal silicate to prevent disintegration; and U.S. Pat. No. 2,986,525 teaching fusing of adsorbent salts, such as alkali and alkaline earth metal salts, to form a eutectoid for improved physical properties of a refrigerant adsorbent.

The use of silica gels as heat storage materials is known, and the addition of an inorganic heat-of-fusion salt to fumed silicon dioxide is taught by International Patent Application Publication No. WO 80/01073. Thermal storage using solid/liquid phase change chemicals is taught using a large number of inorganic salts by U.S. Pat. No. 4,421,661 and 4,512,388.

However, none of the prior art known to the applicant suggests use of thermal absorption/release materials which undergo transition, such as phase change, to greatly reduce and nearly eliminate temperature change in otherwise thermo-cyclic systems.

SUMMARY OF THE INVENTION

Temperature increase during the adsorption or oxidation portion of a thermo-cyclic process severely reduces the capacity of the adsorbent, such as activated carbon or metal oxide, to take up more carbon dioxide or oxygen. Conversely, temperature decrease during the desorption or reduction portion of a thermo-cyclic process severely reduces the ability of the adsorbent to release carbon dioxide or oxygen. This is true of all thermo-cyclic chemical or physical systems which have an exothermic portion which generates heat and an endothermic portion which absorbs heat. The addition of a transition thermal absorption/release material (TARM) absorbs heat during the exothermic portion of the cycle thus reducing or nearly eliminating temperature rise and then releases heat during the endothermic portion of the cycle reducing or nearly eliminating temperature fall. The addition of sufficient quantity of TARM to such cyclic systems reduces or nearly eliminates temperature change during the cycle and thereby greatly increases the capacity of such systems. Suitable TARMs include materials which absorb and release heat at constant temperature, such as liquids, salts, eutectics, and/or metals that undergo transition including gaseous/liquid, liquid/solid, or solid/gaseous phase change. Any suitable TARM that undergoes suitable transition at the desired operating temperature of the thermo-cyclic processing system may be used.

This invention is applicable to all cyclic chemical and physical systems which have an exothermic portion which generates heat during one portion of the thermo-cycle and an endothermic portion which absorbs heat during another portion of the thermo-cycle. Such systems include pressure-swing adsorption processes for gas storage, wherein a gas is adsorbed by a sorbent at a higher pressure and the gas is released by the sorbent at a lower pressure thereby regenerating the sorbent One example is the storage of methane, or natural gas, on activated carbon adsorbents in on-board natural-gas-fueled vehicles. Another example of pressure-swing adsorption is its use for gas separation, for example, for removing carbon dioxide from natural gas, or for producing oxygen from air.

This invention is also applicable to cyclic chemical oxidation/reduction processes such as may be used for producing oxygen from air. Metal oxides, such as manganese and barium, can be cyclically oxidized in an exothermic portion of the cycle and reduced in an endothermic portion of the cycle at temperatures of 1400° to 1500° F. to remove oxygen from air oxidizing the metal oxide during a high pressure oxidation portion of the cycle and subsequently release this oxygen during a low-pressure reduction portion of the cycle.

All of these processes utilize beds of chemicals or adsorbents which are thermo-cyclically processed using different types of gas for different portions of the cycle. The process of this invention provides more effective utilization of these beds of previously used chemicals or adsorbents, such as zeolites, activated carbon, and silica gel by use of in situ TARMs having their transition temperatures at the desired cyclic operating temperatures within these beds. By virtue of the large heat adsorption and release associated with transition, such as phase change, such materials store thermal energy substantially isothermally. Therefore, the use of a TARM having its transition at the desired cycle temperature greatly reduces, and can eliminate, the increase in temperature of the bed during the exothermic portion of the cycle, which renders the bed much more effective for oxidation or adsorption. Use of in situ TARM in such beds effects thermal release providing heat for reduction of the oxide, or regeneration of the sorbent, which reduces or eliminates the need for additional thermal energy input for reduction of the oxide or regeneration of the bed.

This invention is also applicable to most acid gas clean-up systems used to remove $CO_2$, $H_2S$, and COS from refinery or fuel gases. These systems include solvent base systems, such as Rectisol and Selexol; hot carbonate systems such as Benfield, and amine based systems such as monoethanol amine (MEA), diglycol amine (DGA), triethanol amine (TEA), etc. These systems normally use two towers, an absorber tower in which the acid gas is removed by contact with the active solvent or solution at or near system pressure and temperature, and a regenerator, or stripping tower to which the acid gas laden solvent or solution is transported and is stripped of acid gas, usually by contacting with large quantities of steam which supplies necessary heat and lowers the partial pressure of acid gas causing it to evolve. In the process of this invention, a TARM is circulated with the solution from the absorber to the regenerator towers. The TARM must be compatible with circulating fluid systems, that is, the TARM must be added as particles small enough to circulate through pumps and piping. Encapsulated TARM is preferred for such applications. The use of TARM thermal management in such systems reduces, and may nearly eliminate, temperature rise in the absorber, making it more efficient, and reduces, and may nearly eliminate, temperature fall in the stripper, thereby reducing the amount of external heat and/or steam required for regeneration.

DESCRIPTION OF PREFERRED EMBODIMENTS

In a preferred embodiment of the process of the invention, a highly porous sorbent material is impregnated with TARM selected to have its transition, such as phase-change, temperature at the preferred operating temperature of the sorbent. Examples of sorbent materials include, but are not limited to, activated aluminas, molecular sieves, silica gels, activated carbons, silica-base beads and activated bauxite. Depending upon the type of sorbent used, the type of vapor-phase compound being adsorbed, and the temperature of the process stream being treated, the operating temperature may range from sub-ambient to about 2000° F., or greater. The TARM will be chosen such that its transition occurs at the temperature desired for the cyclic process. There are many suitable TARMs covering a wide temperature range known to the art by publications in the thermal energy storage field such as Cryo-Therm, Inc., "Development of High Capacity Heat Storage Materials, Phase I—Study of Materials." Report to Instrumentation Laboratory, MIT, July 15, 1962; Lane, G. A. et al., "Macro-Encapsulation of Heat Storage Phase-Change Materials for Use in Residential Buildings." Final Report to U.S. Department of Energy, Contract No. EY-76-C-05-5217, Dow Chemical Co., November 1978; and Grodzka, P. G., "Space Thermal Control by Freezing and Melting." Second Interim Report. "Space Thermal Control Study." Report to NASA by Lockheed Missiles and Space Company, Contract No. NAS8-211123, May 1969.

Suitable TARMs are those which absorb and release heat at substantially constant temperature by transition including gaseous/liquid, liquid/solid, solid/gaseous phase changes, and transition such as dehydration/hydration at the operating temperature of the thermo-cyclic processing system. Specific examples of TARMs suitable for use over broad thermo-cyclic operating temperatures include:

TABLE 1

| TARM | PHASE CHANGE TYPE | TEMP., °F. | H, Btu/lb |
| --- | --- | --- | --- |
| Ammonia (1 atm) | Gas/Liquid | −28 | 590 |
| Disodium Phosphate Dodekahydrate | Dehydration/ Hydration and Solid/Liquid | 97 | 60 |
| Lithium Borate Octahydrate | Dehydration/ Hydration and Solid/Liquid | 117 | 157 |
| Ethylene Glycol (1 atm) | Gas/Liquid | 387 | 344 |
| Water (41 atm) | Gas/Liquid | 486 | 732 |
| Aluminum | Solid/Liquid | 1220 | 170 |
| Sodium Sulfate (Anhydrous) | Solid/Liquid | 1623 | 74 |
| Copper | Solid/Liquid | 1981 | 88 |

Appropriate TARMs are preferably closely physically associated with the sorbent and may even be entrapped within the sorbent itself, added to a porous support material, added as separate particles, or encapsulated before being intermixed in the sorption bed. A plurality of different TARMs having different transition temperatures may be used to provide a sorbent bed operable under different temperature conditions. In another preferred embodiment of the process, the TARM may be impregnated onto a highly porous inert carrier solid. In this case, it may be desirable to further impregnate the surface of the inert carrier solid with a high thermal conductivity material that melts at a higher temperature than the TARM. In this way, the TARM will be effectively encapsulated within the carrier solid. Such encapsulation may be desired to avoid direct physical contact between the TARM and the active bed material, especially if such contact leads to deleterious reactions.

In yet another embodiment of the process, the TARM is totally encapsulated in plastic, glass or metal shells. The thickness of these shells should be chosen to be consistent with good heat transfer to the TARM. The exterior and/or interior surface of the encapsulating shell may be enlarged with fins or otherwise extended to improve its heat transfer characteristics.

In those cases when the TARM is to be directly added to a bed of solids, such as sorbents, the particle size of the impregnated or encapsulated TARM should be comparable to that of the sorbent, but may be somewhat larger or smaller than that of the sorbent to facilitate separation when the sorbent is spent and either needs reactivation or must be replaced. The two solids may either be blended prior to being charged to the sorbent-containing vessel, or the two materials may be charged in alternate, thin layers compatible with effective heat transfer between the TARM and the sorbent.

A sufficient quantity of TARM should be used to operate the thermo-cyclic process substantially isothermally at about the transition temperature of the TARM during the exothermic and the endothermic portions of the process. TARM should be present in a quantity slightly greater than that of which the latent heat of phase change per unit weight of TARM times the weight of TARM exceeds the heat absorbed or released during the exothermic or endothermic portions of the thermo-cycle, respectively. It is suitable that up to 50 weight percent excess TARM be present, and preferably 10 weight percent and less excess TARM be present.

In one embodiment of this invention, high capacity gas adsorption storage systems, such as methane, which are suitable for rapid storage and delivery may be provided for vehicle on board fuel storage. The TARM thermal management system of this invention provides heat absorption during fast filling, in the order of 5 to 10 minutes required for vehicular refueling, and provides heat necessary for gaseous fuel release and delivery while significantly increasing fuel storage capacity under isothermal operating conditions.

In another embodiment of this invention, low $NO_x$ combustion may be achieved by combusting natural gas at low flame temperatures. This may be achieved by intermittently feeding fuel gas to a burner chamber containing a TARM providing substantially isothermal combustion chamber conditions at a desirably low temperature. For example, copper having a solid/liquid phase change at 1980° F. may be used as a TARM.

In order to more fully illustrate the invention and the manner of practicing the invention, the following examples are presented with specific materials and operating conditions which should not be considered to limit the invention.

EXAMPLE I

The $CO_2$ content of a natural gas stream, at ambient temperature, 25° C., and 750 psig, is reduced from 2.0 to 0.1 mole percent by a pressure-swing adsorber bed containing a suitable molecular sieve, such as Union Carbide Type 5A pellets. By impregnating the molecular sieve with 34% by weight of a solid/liquid phase-change thermal adsorption/release material, $LiBO_2 \cdot 8H_2O$, the bed temperature is held constant at about 117° F., the temperature of solid/liquid phase change, and the $CO_2$ capacity is 17.8 lb/100 lb molecular sieve. Without this TARM present, the temperature of the sorbent bed would rise approximately 50° F. to about 167° F. and the $CO_2$ adsorbing capacity would be reduced to 16.4 lb $CO_2$/100 lb molecular sieve. To achieve the same performance, by using excess molecular sieve material, and without a TARM present would require about 50% more molecular sieve in the bed.

EXAMPLE II

A phase-change thermal adsorption/release salt hydrate, $Na_2HPO_4 \cdot 12 H_2O$, sodium phosphate, dibasic, was encapsulated in 0.635 cm OD bronze tubing, wall thickness 0.0356 cm. Each end of the tube was crimped in a V-shaped die and subsequently sealed with solder. Thirty-five bronze tubes each 17.78 cm long, filled with approximately 5 grams of the salt hydrate, were placed into a 1-liter cylinder and AX21 carbon, having a specific surface area of 2440 m²/gm was added and packed to a bed density of 0.38 g/cc. The cylinder dimensions were: overall length=27.94 cm, OD=8.89 cm, wall thickness=0.531. The 35 tubes occupied 175 cc of volume, 17.5%, and the AX21 carbon occupied 825 cc, 82.5%, of volume.

The 1 liter cylinder containing the AX21 carbon and the 35 TARM encapsulating tubes was then connected to a higher pressure methane supply apparatus. The supply apparatus contained high-pressure methane supply cylinders, regulators, a Micro Motion mass flow meter, Honeywell pressure transmitters, back pressure regulators, ball valves, Swagelock tube fittings, 304 stainless steel tubing, a vacuum pump, a Televac vacuum gauge, rotometers, thermocouples, and a Hewlett-Packard 3852A data acquisition/9000 series 310 processor control unit along with Hewlett-Packard hard drive and floppy disc memory, monitor, printer, and plotter. A 30 Kg Sartorius balance was used to determine the weights of the components of the test cylinder and the quantities of methane adsorbed.

The cylinder was evacuated overnight until a constant weight was attained. This step eliminated air and other extraneous adsorbates from the cylinder and established a "clean" initial state for both tests. The cylinder was then filled slowly with methane to 1 atm at room temperature, disconnected, and after establishing equilibrium at 1 atmosphere pressure weighed to determine the amount of methane adsorbed. For the adsorption portion of the cycle, the cylinder was then reconnected to the methane supply and subjected to 35 atmosphere methane for 5 minutes. After the 5 minute fill, the cylinder was disconnected and weighed to determine the amount of methane adsorbed by the AX21 carbon.

For the desorption portion of the cycle, the cylinder was reconnected to the test apparatus and allowed to equilibrate to room temperature. The cylinder was then discharged against a back pressure of 1.2 atmospheres at a flow rate of 40 cc/s until the delivery flow fell below the rate of ½l/min. After the discharge was completed the unit was reweighed to determine the amount of methane delivered/recovered from the cylinder. The methane desorbed was the total amount adsorbed minus the equilibrium value at desorption temperature. During both the adsorption and desorption segments of the cycle, the temperature profile within the AX21 carbon bed was monitored with time.

EXAMPLE III

Using the same apparatus as described in Example II methane adsorption and desorption was conducted under the same conditions as in Example II except that the bronze tubes were empty, no TARM present.

The results of Examples II and III are shown in Table 2.

TABLE 2

| Test Conditions | Example II | Example III |
| --- | --- | --- |
| Cylinder Volume, L | 1 | 1 |
| Weight of AX21 Carbon, g | 313 | 313 |
| Number of Bronze Tubes | 35 | 35 |
| Weight of TARM (Na$_2$HPO$_4$.12H$_2$O) g | 175 | 0 |
| Fill Time, minutes | 5 | 5 |
| Fill Pressure, atm | 35 | 35 |
| Discharge Time, minutes | 17 | 17 |
| Discharge Pressure, atm | 1.2 | 1.2 |
| Adsorption Portion Results | | |
| Initial Temperature, °C. | 25 | 26 |
| Peak Temperature, °C. | 35 | 95 |
| Time Peak Temperature Reached, seconds | 15 | 35 |
| Temperature After 5 Minutes, °C. | 35 | 94 |
| Methane Adsorbed, L | 97 | 63 |
| Desorption Portion Results | | |
| Initial Temperature, °C. | 24 | 22 |
| Valley Temperature, °C. | 24 | −39 |
| Time Valley Temperature Reached, minutes | — | 6 |
| Temperature After 16 minutes, °C. | 24 | −34 |

The results set forth in Table 2 show 54 percent increase in methane storage due to the isothermal adsorption of methane at 35° C. as compared with the temperature increase to 95° C. when no phase-change thermal adsorption/release material was used. Similar benefits were obtained in the isothermal desorption of methane at 24° C. as compared to the temperature decrease to −39° C. when no TARM was used.

EXAMPLE IV

A 9 inch diameter by 12 inch long burner chamber is filled with 23 pounds of ¼ inch diameter porous alumina pellets impregnated with 18 pounds of copper metal, which melts at 1980° F. as a TARM. The surface of the pellets is impregnated with iron, which melts at 2795° F. The iron provides both encapsulation and heat transfer access. The burner is then operated in a cyclic mode in such a way that natural gas fuel is intermittently fed for alternate one minute periods at a flow rate of 200 standard cubic feet per hour. Combustion air is continuously fed at a rate of 2100 standard cubic feet per hour providing 5% excess air. During the one minute periods of fuel flow, the exothermic portion of the cycle, approximately 3400 Btu of combustion heat is released, 1600 Btu of which are absorbed by melting the copper contained within the alumina pores. The absorption of combustion heat reduces the flue gas temperature to 1980° F., the melting point of copper. Because of this low temperature, nitrogen oxide emission levels are maintained below 5 parts per million. At the end of each one-minute combustion cycle the natural gas flow is turned off while combustion air continues to flow for one minute. During the one minute periods of no fuel flow, the endothermic portion of the cycle, the combustion air is heated from 60° F. to 1980° F., due to the release of heat from solidification of the liquid copper contained in the alumina pores. The one minute fuel on/one minute fuel off cycle is repeated producing a continuous flow of hot gas at 1980° F. from the burner. This low NO$_x$ working fluid can be used for direct heating applications or, if produced at pressure, for turbine feed.

This technique can be used to reduce the operating temperature of other exothermic processes. For example, the exothermic oxidative coupling of methane and oxygen in air can be controlled at 700.F to increase the production of ethylene and reduce the production of undesirable products, such as carbon dioxide which forms at temperatures above 700° F. In this case, the air would flow continuously and the methane would flow intermittently. Alternatively, steam could be used during the fuel off-cycle to remove heat from the TARM.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. In a thermo-cyclic process of the type having an exothermic portion and a n endothermic portion, the improvement comprising; conducting said thermo-cyclic process in thermal exchange relation with a sufficient quantity of transition thermal absorption/release material to operate said thermo-cyclic process substantially isothermally at about the transition temperature of said thermal absorption/release material utilizing the latent heat of said transition thermal absorption/release material during said exothermic and said endothermic portions of said thermo-cyclic process.

2. In a thermo-cyclic process according to claim 1 wherein said transition is a solid/liquid phase change.

3. In a thermo-cyclic process according to claim 1 wherein said transition is a liquid/gas phase change.

4. In a thermo-cyclic process according to claim 1 wherein said transition is a solid/gas phase change.

5. In a thermo-cyclic process according to claim 1 wherein said transition is a dehydration/hydration.

6. In a thermo-cyclic process according to claim 1 wherein said thermal adsorption/release material is contained within a shell having thermal transfer properties.

7. In a thermo-cyclic process according to claim 6 wherein at least one surface of said shell has increased surface area for enhanced thermal transfer.

8. In a thermo-cyclic process according to claim 1 wherein said thermal absorption/release material is contained within the pores of a porous solid support.

9. In a thermo-cyclic process according to claim 8 wherein said pores are sufficiently small to inhibit loss of said thermal absorption/release material upon liquefaction or vaporization.

10. In a thermo-cyclic process according to claim 8 wherein said pores of said solid support are sealed by fusion of said support material.

11. In a thermo-cyclic process according to claim 8 wherein said support is sealed by a covering of a thermal transfer material having a higher melting temperature than the transition temperature of said thermal absorption/release material used in said thermo-cyclic process.

12. In a thermo-cyclic process for storage of gas by exothermic adsorption and endothermic desorption by a solid adsorbent, the improvement comprising; conducting said thermo-cyclic process in thermal exchange relation with a sufficient quantity of transition thermal absorption/release material to operate said thermo-cyclic process substantially isothermally at about the transition temperature of said thermal absorption/release material utilizing the latent heat of said transition thermal absorption/release material during said exothermic adsorption and said endothermic desorption portions of said thermo-cyclic process.

13. In a thermo-cyclic process according to claim 12 wherein said gas comprises methane.

14. In a thermo-cyclic process for storage of methane according to claim 13 wherein said transition is a solid/liquid phase change.

15. In a thermo-cyclic process for storage of methane according to claim 13 wherein said solid adsorbent is carbon.

16. In a thermo-cyclic process for storage of methane according to claim 13 wherein said thermal absorption/release material is disodium hydrogen phosphate dodecahydrate.

17. In a thermo-cyclic intermittent combustion process having exothermic flame-on and endothermic flame-off portions, the improvement comprising; conducting said thermo-cyclic intermittent combustion process in thermal exchange relation with a sufficient quantity of transition thermal absorption/release material to operate said thermo-cyclic intermittent combustion process substantially isothermally at about the transition temperature of said thermal absorption/release material utilizing the latent heat of said transition thermal absorption/release material during said exothermic flame-on and said endothermic flame-off portions of said thermo-cyclic process.

18. In a thermo-cyclic intermittent combustion process according to claim 17 wherein said thermal absorption/release material comprises copper and said transition is solid/liquid phase change.

19. In a thermo-cyclic intermittent combustion process according to claim 17 wherein said thermal absorption/release material is contained within the pores of a porous solid support.

20. In a thermo-cyclic intermittent combustion process according to claim 19 wherein said pores are sufficiently small to inhibit loss of said thermal absorption/release material upon liquefaction or vaporization.

21. In a thermo-cyclic intermittent combustion process according to claim 19 wherein said support is sealed by a covering of a thermal transfer material having a higher melting temperature than the transition temperature of said thermal absorption/release material used in said thermocyclic process.

22. In a thermo-cyclic intermittent combustion process according to claim 19 wherein said pores of said solid support are sealed by fusion of said support material.

23. In a thermo-cyclic pressure swing adsorption process having an exothermic and an endothermic portion for separating or concentrating gas constituents, the improvement comprising conducting said thermo-cyclic process in thermal exchange relation with a sufficient quantity of transition thermal absorption/release material to operate said thermo-cyclic process substantially isothermally at about the transition temperature of said thermal absorption/release material utilizing the latent heat of said transition thermal absorption/release material during said exothermic and said endothermic portions of said thermo-cyclic process.

24. In a thermo-cyclic process according to claim 23 wherein said transition is a phase change.

25. In a thermo-cyclic process according to claim 23 wherein said thermal adsorption/release material is contained within a shell having thermal transfer properties.

26. In a thermo-cyclic process according to claim 23 wherein said thermal absorption/release material is contained within the pores of a porous solid support.

27. In a thermo-cyclic absorption gas clean-up process having an exothermic and an endothermic portion comprising liquid and gas stripping of liquid solvent, the improvement comprising conducting said thermo-cyclic process in thermal exchange relation with a sufficient quantity of transition thermal absorption/release material to operate said thermo-cyclic process substantially isothermally at about the transition temperature of said thermal absorption/release material utilizing the latent heat of said transition thermal absorption/release material during said exothermic and said endothermic portions of said thermo-cyclic process.

28. In a thermo-cyclic absorption gas clean-up process according to claim 27 wherein said transition is a phase change.

29. In a thermo-cyclic absorption gas clean-up process according to claim 27 wherein said thermal adsorption/release material is contained within a shell having thermal transfer properties.

30. In a thermo-cyclic absorption gas clean-up process according to claim 27 wherein said thermal absorption/release material is contained within the pores of a porous solid support.

* * * * *